April 21, 1959
B. F. ABBOTT
2,883,153
TOOL FOR REMOVING BALANCE WEIGHTS FROM RIMS
OF WHEELS OF AUTOMOTIVE VEHICLES
Filed March 2, 1955
2 Sheets-Sheet 1
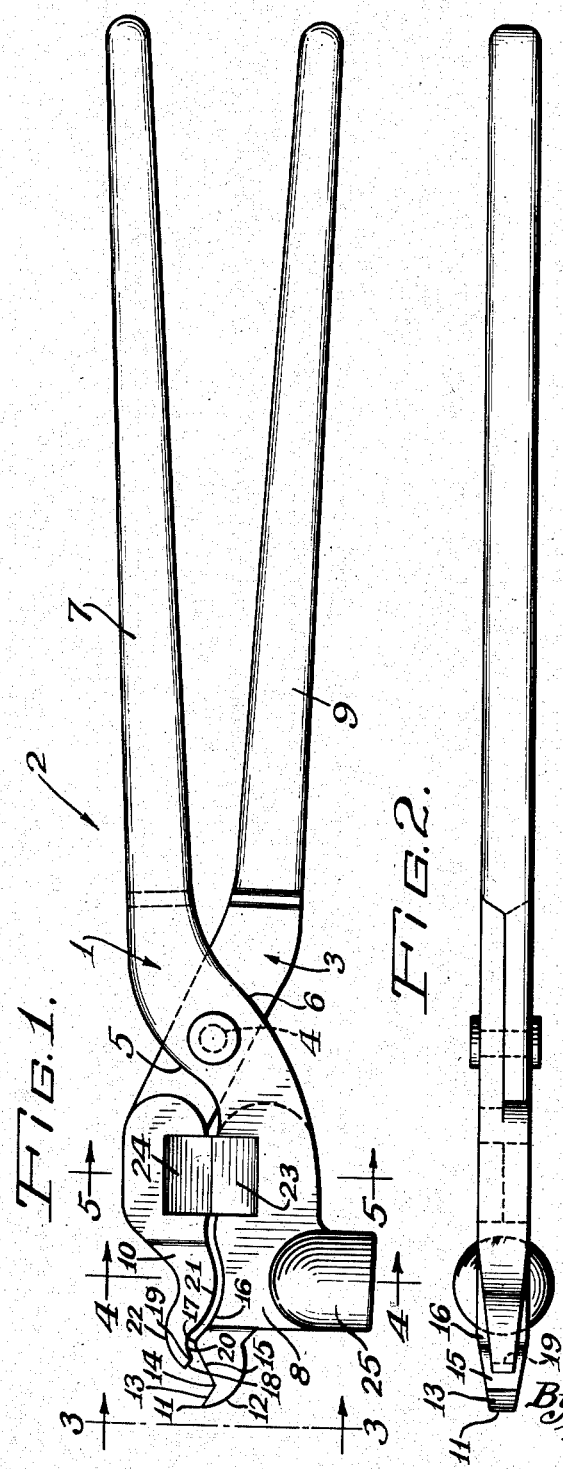
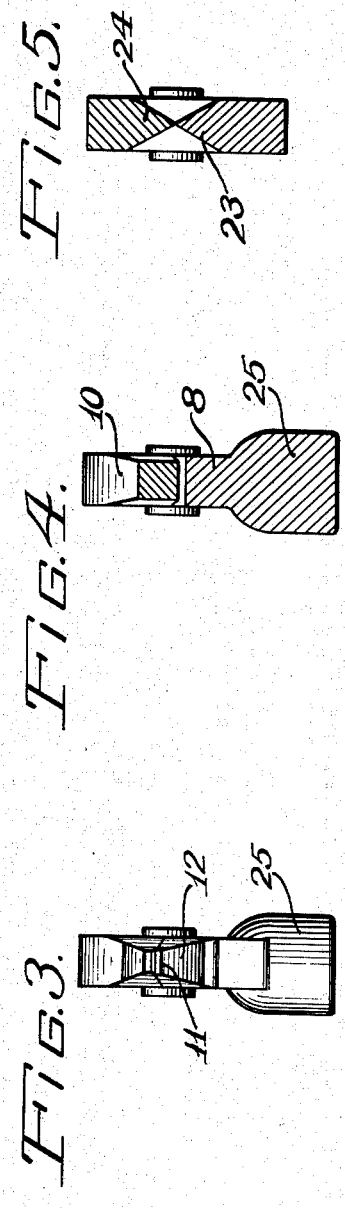
Inventor:
Bert F. Abbott
By Gary, Desmond & Parker
Attys.

April 21, 1959
B. F. ABBOTT
2,883,153
TOOL FOR REMOVING BALANCE WEIGHTS FROM RIMS
OF WHEELS OF AUTOMOTIVE VEHICLES
Filed March 2, 1955
2 Sheets-Sheet 2
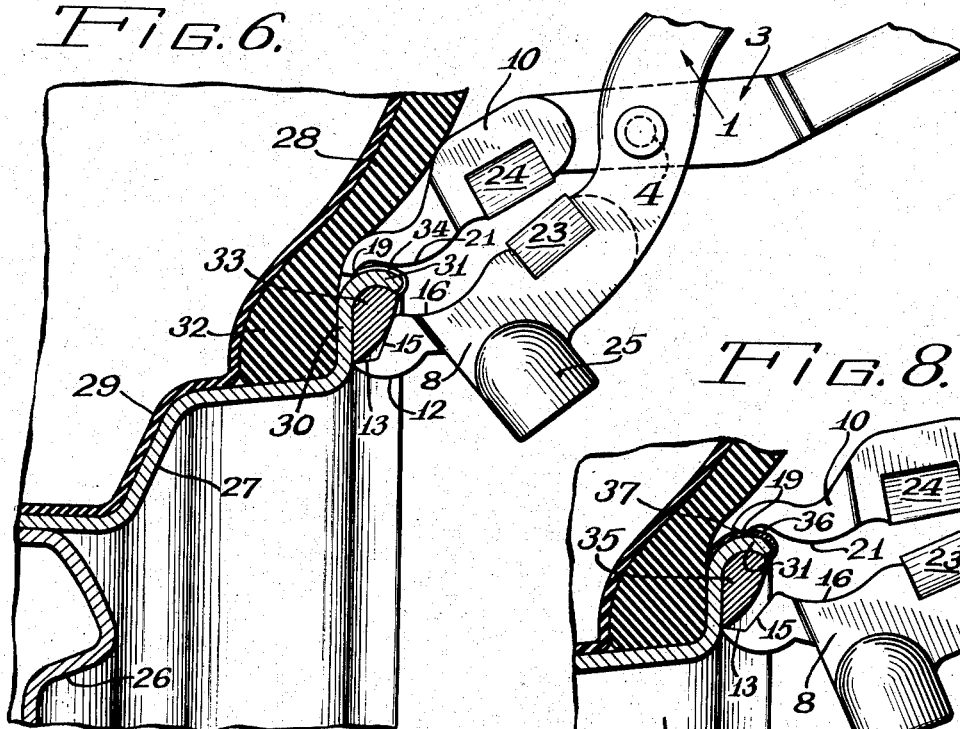
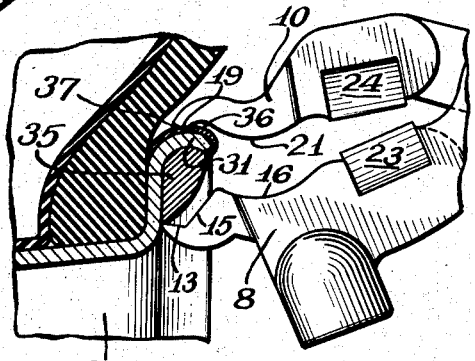
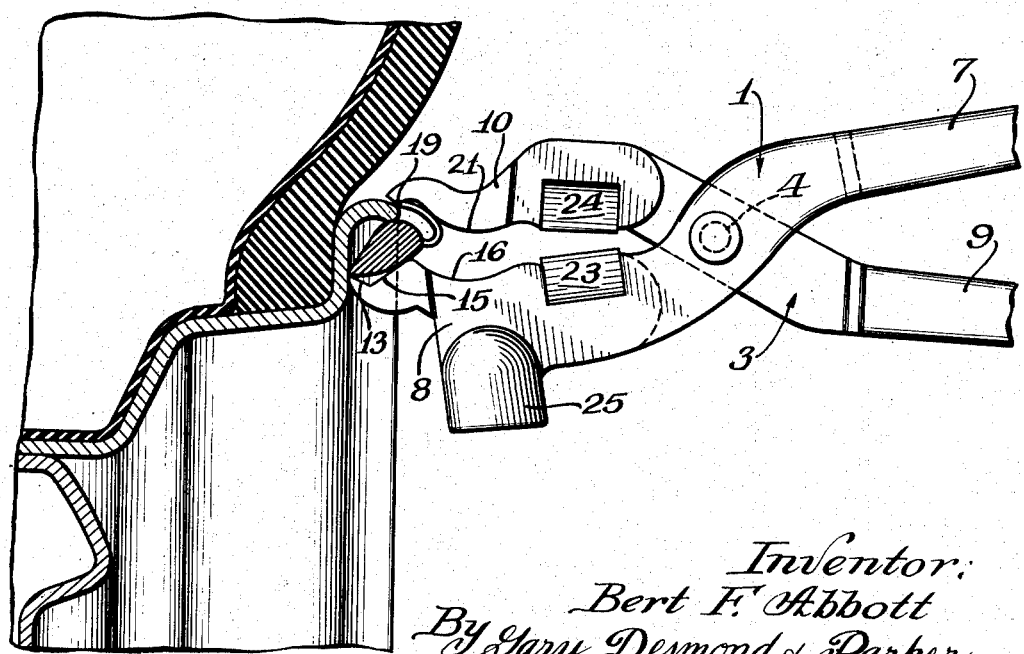
Inventor:
Bert F. Abbott
By Gary, Desmond & Parker
Attys.

United States Patent Office 2,883,153
Patented Apr. 21, 1959

2,883,153

TOOL FOR REMOVING BALANCE WEIGHTS FROM RIMS OF WHEELS OF AUTOMOTIVE VEHICLES

Bert F. Abbott, Elmhurst, Ill., assignor to Bear Manufacturing Company, Rock Island, Ill., a corporation of Illinois Application March 2, 1955, Serial No. 491,718

3 Claims. (Cl. 254—131)

This invention relates ot improvements in a tool for removing balancing weights from the rims of automotive wheels.

To statically and dynamically balance wheels of automotive vehicles, weights are mounted upon the rims of the wheels to compensate or balance unbalanced portions of the wheels. The balance weights, so-called, are so constructed as to not detract from the appearance of the wheel and are removable so that they can be removed, repositioned or replaced as the balance of the wheels might change due to tire wear, impacts, etc. Yet the weights although removable must be firmly secured to the wheel rim so as not to be displaced or fall off the wheel during normal use of the vehicle.

In some types of testing devices for determining the balance of wheels of automotive vehicles, the device is applied to the wheel being tested while the wheel is in situ upon the vehicle. Such balance testing devices are mounted upon the face or hub portion of the wheel being tested and extend laterally outwardly from the face of the wheel and are of a diameter slightly less than the rim of the wheel. Tools have heretofore been proposed for removing balance weights from wheels but all tools heretofore proposed, it is believed, require swingable radial movement in a path which is obstructed by a balance tester which may be carried by the wheel. Hence, such tools cannot be employed with balance testing devices while the tester is mounted on the wheel. Inasmuch as the operation of balancing a wheel comprises the steps of testing the wheel balance and adding, removing or replacing balance weights as the balance test proceeds, the removal or relocation of balance weights poses a difficult problem.

The present invention contemplates a balance weight removal tool which is so contrived as to be operable to remove balance weights from a vehicle wheel without being movable or manipulatable in the zone occupied by a balancer carried by the wheel.

Another feature of the invention resides in a balance weight removal tool construction characterized in that the balance weights may be removed with great facility and with a minimum of damage to the weight clip of the weight being removed.

Other objects and advantages of the invention will be apparent from the accompanying drawings and following detailed description.

In the drawings,

Fig. 1 is a side elevational view of the improved balance weight removal tool.

Fig. 2 is a top plan view of the tool illustrated in Fig. 1.

Fig. 3 is an end elevational view looking in the direction of the arrows 3—3 on Fig. 1.

Fig. 4 is a transverse sectional view taken on line 4—4 of Fig. 1.

Fig. 5 is a transverse sectional view taken on line 5—5 of Fig. 1.

Fig. 6 is a fragmentary detailed elevational view, parts being shown in section, of one manner of use of the tool.

Fig. 7 is a view similar to Fig. 6 showing the tool at a subsequent sequential position.

Fig. 8 is a view similar to Fig. 6 showing the use of the tool in removing a modified form of balance weight.

Referring in detail to the drawings, 1 indicates one arm of the weight removal tool 2 comprising an embodiment of the invention, and the reference numeral 3 indicates a cooperative arm of the tool. For convenience in identifying the arms 1 and 3, but not as a functional limitation of the respective arms, arm 1 will be hereinafter referred to as the fulcrum arm and arm 3 will be referred to as the gripping arm. The arms 1 and 3, intermediate their lengths are pivotally joined together by pivot pin 4 which may conveniently take the form of a rivet or bolt, the arms being joined to provide a plier-like tool.

Both arms 1 and 3 are offset intermediate their lengths, as shown at 5 and 6 in Fig. 1, the pivot pin 4 extending through the offset portions of the arm. The fulcrum arm 1 comprises a relatively elongated handle portion 7 and a fulcrum jaw 8 on opposite sides of pin 4, and gripping arm 3 comprises a relatively elongated handle portion 9 and a gripping jaw 10 on opposite sides of the pivot pin, the handle portions 7 and 9 being on the same side of the pivot and the jaws 8 and 10 being on the same side of the pivot, respectively.

A feature of the present invention resides in the novel formation of each of the jaws 8 and 10 and their relationship to each other which renders the tool 2 most efficient for its intended specialized purpose.

Referring particularly to the fulcrum arm 1, the jaw 8 terminates at its end in a substantially sharp edge 11 formed by the intersection of a curved outer portion 12 and a substantially planar inner portion 13. The planar portion 13 forms a dihedral angle 14 with a second planar portion 15, the angle 14 being an inner obtuse angle. The opposite edge of the planar portion 15 joins with an arcuately curved inner surface 16, which, as viewed in Fig. 1, is concave upwardly. The zone of juncture of the planar portion 15 and surface 16 is formed with a radius, as shown at 17 in Fig. 1.

The gripping jaw 10 extends a lesser distance from the pivot 4 than does the fulcrum jaw 3, and terminates in a relatively blunt, rectangular section 18, having a relatively short inner edge 19. The edge 19 comprises the line of intersection of the blunt rectangular portion 18 and a curved surface which conforms generally with a portion of the planar surface 15 and the curved surface 16 of the fulcrum jaw 8. Thereafter, in the direction of the pivot, the curved surface 20 merges or blends with a reverse curved surface 21 which conforms substantially with the surface 16.

The outer surface 12 of the fulcrum jaw diverges from the edge 11 so as to provide strength to the working surfaces of the jaw and in somewhat similar fashion the outer surface 22 of the gripping jaw diverges from the blunt portion 18 conforming generally in curvature to the inner surfaces 20 and 21 but gradually diverging from said latter surfaces toward the pivot 4.

When the jaws 8 and 10 are in closed non-working position relative to each other, the surfaces 15, 20 and 16 of the fulcrum jaw are spaced and substantially parallel, respectively, to surfaces 20 and 21 of the gripping jaw 10. The inner surfaces are spaced in this fashion by a pair of cutting knives 23 and 24 carried respectively by the fulcrum jaw 8 and the gripping jaw 10. The cutting knives 23 and 24 terminate toward each other in cooperative, abutting cutting edges which contact each other to space the jaws when the latter are in closed position. The purpose of the cutting knives will be hereinafter more fully described.

Carried at the outer portion of the fulcrum jaw 8 is a hammer head 25 the purpose of which will be hereinafter described. Both cutting knives 23 and 24 are preferably formed integral with the gripping jaw 10 and the hammer head 25 is preferably formed integral with the fulcrum jaw 8.

In Figs. 6, 7 and 8 the use of the tool comprising the present invention is illustrated. The reference numeral 26 indicates a conventional wheel upon which is mounted a conventional tire rim 27. A tire is mounted upon the rim, the tire comprising an outer casing 28 and an inner tube 29. The outer portion of the rim 27 carries a radially extending flange 30 which terminates in an outwardly curved lip 31. The function of the flange 30 is to firmly grip the bead 32 of the outer casing to hold the tire firmly on the rim.

It is desirable in the maintenance of automotive vehicles to maintain the wheels balanced both statically and dynamically. Wheel balancing testers have heretofore been employed to test the balance condition of the wheels by rotating the wheels at a relatively high speed and measuring the degree of vibration. The testers are so devised that they not only indicate the degree and amplitude of vibration due to an unbalanced condition of the wheel, but also locate the portion of the wheel which is unbalanced. Knowing the degree of unbalance of the wheel and also knowing the location of the weight causing the unbalance of the wheel, an operator can readily balance the wheel by applying weights to the wheel diametrically opposite from the point of unbalance.

The weights which are employed in compensating or balancing a wheel comprise a lead slug 33 which is so shaped in section as to conform, more or less, with the inner face of the curved annular tongue 31. The weight is also curved longitudinally to conform more or less with the curvature of the rim. Secured to the weight 33 is a spring clip 34 usually constructed of highly tempered steel, the clip 34 being sufficiently resilient to frictionally grip a portion of the annular tongue 31 and thus retain the weight 33 adjacent the inner curved surface of the annular tongue 31. The normal position of a balance weight is illustrated in Fig. 6.

In applying the balance weights the open end of the spring clip 34 is brought into embracing engagement with the edge of the annular lip 31 and the clip is driven to the position shown in Fig. 6 by hammering the clip inwardly toward the annular lip 31. To conveniently accomplish this operation with the present tool, the hammer head 25 may be employed. After the weight has been positioned upon the rim, use of the vehicle will tend to again unbalance the wheel. For instance, the wheel may become unbalanced due to uneven tire wear or by virtue of impacts which may tend to alter the shape of the rim or the balance weights carried by the rim may be accidentally displaced during the use of the wheel. When this condition occurs it is necessary to rebalance the wheel and incident thereto it becomes necessary to remove the weights which were previously mounted upon the rim. The present invention contemplates a tool which is ideally adapted for removing balance weights which have previously been mounted upon a rim.

With the balance weight mounted upon the rim in its normal position, as illustrated in Fig. 6, the tool may be so disposed with respect to the weight that the fulcrum jaw 8 is positioned in contact with the lead slug 33. The surfaces 13 and 15 of the fulcrum jaw 8 are so positioned relative to each other that said surfaces are brought into spaced contact with the lead slug. The gripping jaw is simultaneously positioned upon the outer face of the annular lip 31 adjacent the zone where the casing 28 contacts the inner portion of the lip. The outer end portion of the gripping jaw 10 is so formed that its outer curved surface 22 may urge the casing inwardly until the relatively sharp edge 19 engages the free edge of the spring clip 34. When the tool has been applied to the weight in this fashion, the tool may be rocked in a clockwise direction, as viewed in Fig. 6, the fulcrum jaw 8, together with the slug 33, functioning as a fulcrum or pivot about which the tool may be rocked. The rocking of the tool, by virtue of the engagement of the edge 19 with the free edge of the resilient clip 34 causes said clip to be moved outwardly along the curved outer surface of the annular lip 31. This action is graphically illustrated in Fig. 7 wherein it will be noted that the rocking of the tool from the position shown in Fig. 6 to the position shown in Fig. 7 rotates the balance weight so as to slide the spring clip outwardly along the outer surface of the annular lip 31 while simultaneously rocking the slug 33 supported by the surfaces 13 and 15, in a clockwise direction. In this fashion the weight is removed from the rim without unduly deforming the slug 33 or the resilient clip 34.

It will be noted that as the tool moves in a clockwise direction, as viewed in Fig. 6 and Fig. 7, the curved surfaces 20 and 21 of the gripping jaw lie closely adjacent the outer surface of the resilient clip 34. In view of the fact that the major force exerted upon the clip is at the free end of the clip, there is a tendency for the clip to buckle when the force is applied. However, buckling of the clip is prevented by the surfaces 20 and 21 of the gripping jaw, said surfaces acting as a reinforcement for the clip during its removal. In addition, the edge 11 of the fulcrum jaw 8 functions, more or less, as a fulcrum and facilitates the rotating movement of the slug 33 from the position shown in Fig. 6 to the position shown in Fig. 7.

In some forms of balance weights, the spring clip is provided with an aperture to facilitate the removal of the weight. Referring particularly to Fig. 8 such a balance weight is illustrated, the slug being designated by the reference numeral 35 and the resilient clip being designated by the reference numeral 36. It will be noted that an aperture 37 is provided in the spring clip. In employing the tool 2 to remove this type of weight, the edge 19 of the gripping jaw is brought into engagement with the aperture 37 and the edge 11 of the fulcrum jaw is brought into contact with the inner edge portion of the slug 35. The tool may then be rocked in a clockwise direction, as viewed in Fig. 8, and in a fashion substantially as hereinbefore described, the spring clip 36 is removed from the annular lip 31.

In some forms of balance weights an indentation is formed in the spring clip instead of the aperture 37. With a clip of this type, the edge 19 will be brought into engagement with the indentation and the tool will be manipulated in the same fashion as hereinbefore described.

To complete the function of the tool 2, the cutting knives 23 and 24 may be conveniently carried by the opposed jaws 8 and 10. The knives are provided for the cutting of the slugs 33 or 35 if a fractional weight is found desirable to balance the wheel.

In some forms of balance testers, the testers are mounted upon the vehicle wheel and the balance is ascertained while the wheel remains on the vehicle, it being necessary only to jack up that portion of the vehicle so as to permit free rotation of the wheel. When employing this type of balancer, the balancer is usually mounted upon the hub portion of the wheel and extends laterally outwardly from the outer face of the wheel. In addition, the balancer is of a diameter which approximates, more or less, the diameter of the rim. Hence, in removing weights from a rim of a wheel upon which the balancer is mounted, the tool must be capable of removing the balance weight without having the tool's movement be obstructed by the balancer carried upon the wheel. It will be noted with specific reference to Figs. 6 and 7 that the rocking movement of the tool 2 in a clockwise direction takes place in what might be referred to as the second quadrant considering the balance weight as the origin. It will be noted that when the tool reaches an approximate horizontal position, the balance weight is substantially completely removed from the rim. Thus, it is unnecessary to move the tool into the zone wherein it would be obstructed by the balancer carried by the wheel.

This feature of the present invention is of extreme importance when this type of balancer is employed since the normal operation of balancing a wheel requires that weights be applied or removed intermittently with the operation of the balancer. By employing the tool comprising the present invention to remove weights from the wheel, it would be unnecessary to remove the balancer from the wheel each time a weight is to be removed or relocated.

Although the present tool is particularly adaptable for use with a balancer which measures the balance condition of a wheel while the wheel is in situ upon the vehicle, it is not to be limited to this specific use since it is more efficient in removing weights from wheel rims than similar tools heretofore proposed regardless of the manner in which the wheels may be balanced.

I claim as my invention:

1. A tool for the removal of balance weights from the rim of an automotive vehicle wheel which comprises, a pair of arms pivoted together intermediate their length to form opposed handle portions and opposed jaw portions upon opposite sides of said pivot, said handle portions and said jaw portions being generally parallel to a single line passing through said pivot when said jaws are closed, said jaw portions comprising a fulcrum jaw and a gripping jaw, said fulcrum jaw being of greater length than said gripping jaw, the opposed inner surfaces of both jaws being sinuously curved and generally conforming with each other throughout their common length, the gripping jaw terminating in a relatively blunt substantially rectangular sectioned end and having a relatively sharp transverse edge adjacent the surface of the opposed jaw for engaging the spring clip of a balance weight mounted upon a wheel rim, and the fulcrum jaw terminating in a relatively sharp transverse edge for engaging the lead slug of the balance weight, said latter edge being offset outwardly from said pivot a greater distance than said first mentioned edge whereby when the handles are rocked circularly the end of the gripping jaw moves about an arc the substantial center of which is the end of the fulcrum jaw.

2. A tool for the removal of balance weights from the rim of an automotive vehicle wheel which comprises, a pair of arms pivoted together intermediate their length to form opposed handle portions and opposed jaw portions upon opposite sides of said pivot, said jaw portions comprising a fulcrum jaw and a gripping jaw, said fulcrum jaw being of greater length than said gripping jaw, the opposed inner surfaces of both jaws being sinuously curved and generally conforming with each other throughout their common length, the gripping jaw having a relatively sharp edge portion adjacent its end for engaging the resilient clip of a balance weight mounted upon a wheel rim, and the fulcrum jaw terminating in a relatively sharp edge for engagement with the lead slug of the balance weight, said latter edge being offset outwardly from said pivot a greater distance than said first mentioned edge, the outer surface of said fulcrum jaw receding from the sharp end edge carried by said jaw along a curve, and the outer surface of said gripping jaw gradually diverging from its end portion with respect to the inner sinuous surface thereof and conforming generally to said inner sinuous surface of said gripping jaw.

3. A tool for the removal of balance weights from the rim of an automotive vehicle wheel which comprises, a pair of arms pivoted together intermediate their length to form opposed handle portions, a fulcrum jaw comprising an extension of one handle portion on the opposite side of the pivot, and an opposed gripping jaw comprising a continuation of the other handle portion, said fulcrum jaw terminating a relatively sharp edge, the inner surface of said jaw receding from said edge along a first planar surface, a second planar surface joined to said first planar surface and making an obtuse dihedral angle with said first planar surface less than 180 degrees, the opposite edge of said second planar surface joining with a curved surface extending toward said pivot, the gripping jaw terminating in a relatively blunt surface having a relatively sharp transverse edge adjacent the surface of the opposed jaw, the inner surface of said gripping jaw receding from said sharp edge toward said pivot along a surface which conforms generally with a portion of the second planar surface and the curved surface of the fulcrum jaw, the sharp edge of said fulcrum jaw being offset from said pivot a greater distance than the sharp edge carried by said gripping jaw.

References Cited in the file of this patent

UNITED STATES PATENTS

| 858,257 | Breiding | June 25, 1907 |
| 919,370 | Lund | Apr. 27, 1909 |
| 1,452,545 | Bradley | Apr. 24, 1923 |
| 1,549,919 | Newman | Aug. 18, 1925 |
| 1,898,849 | Odom | Feb. 21, 1933 |
| 2,274,126 | Carrigan | Feb. 24, 1942 |
| 2,629,114 | Peterson | Feb. 24, 1953 |